Figure 1:
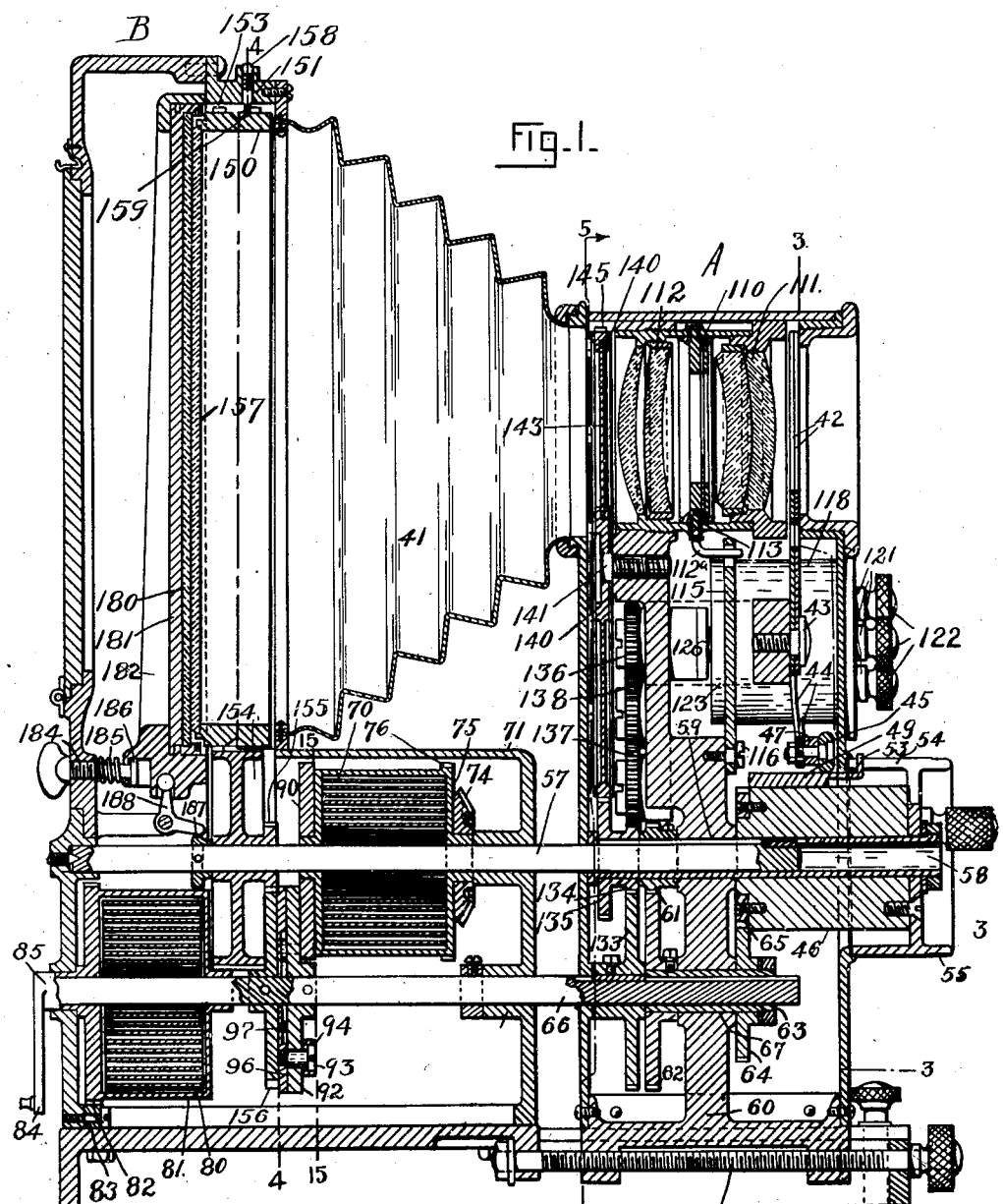

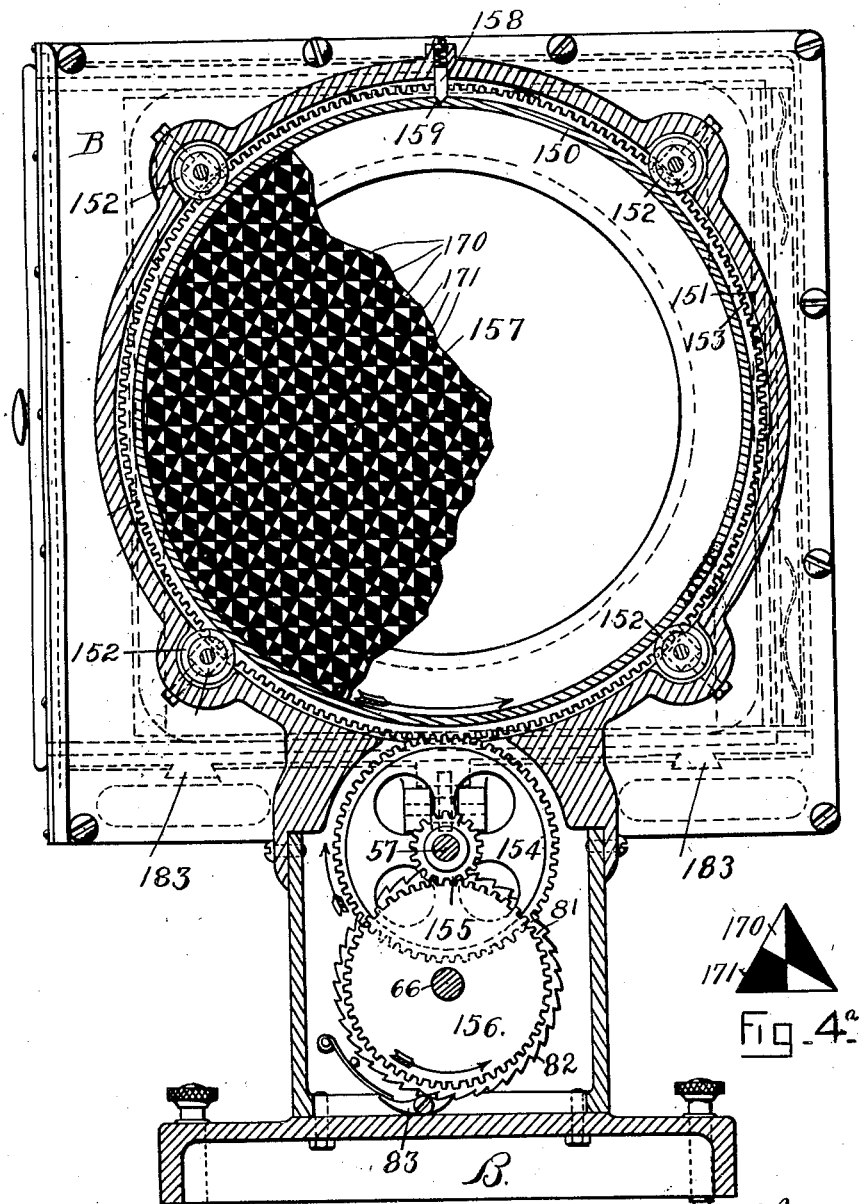

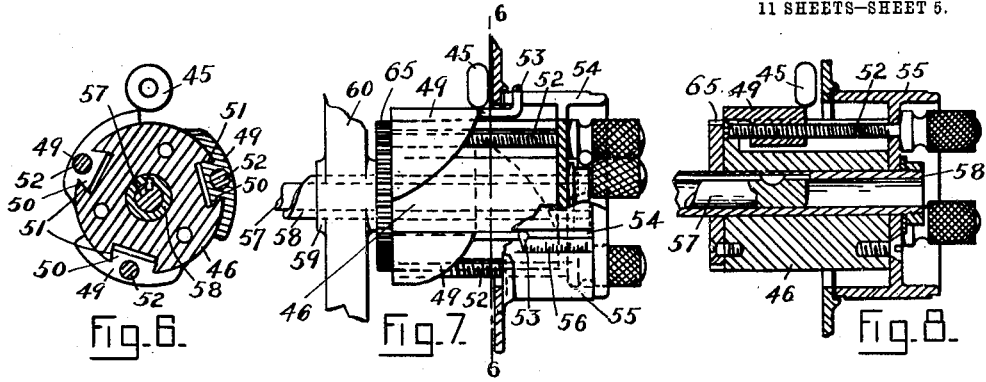
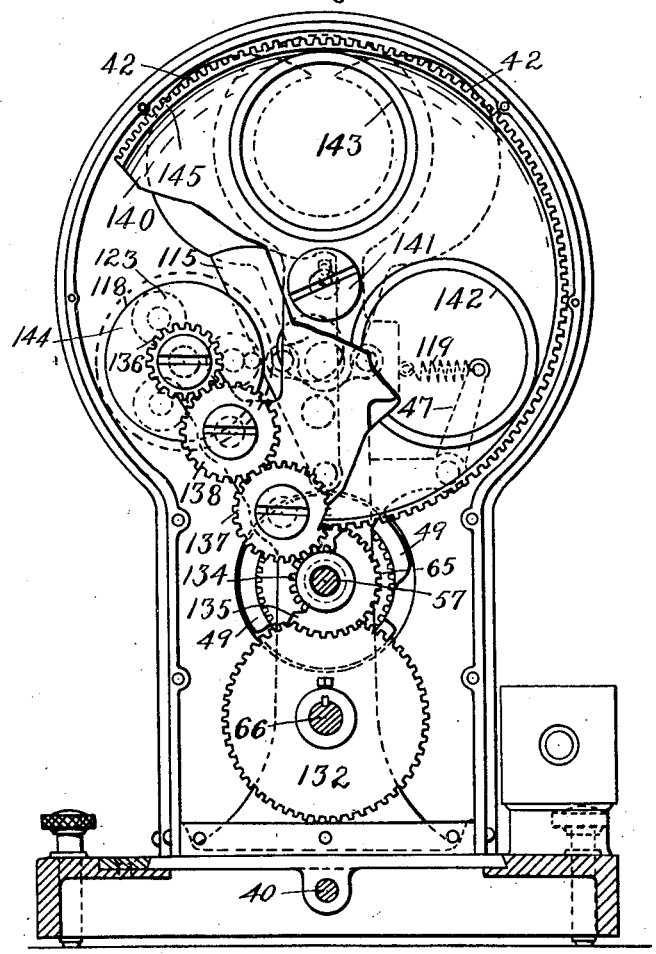

W. C. HUEBNER.
PHOTOGRAPHIC CAMERA.
APPLICATION FILED MAY 31, 1912.
1,051,591.
Patented Jan. 28, 1913.
11 SHEETS—SHEET 6.
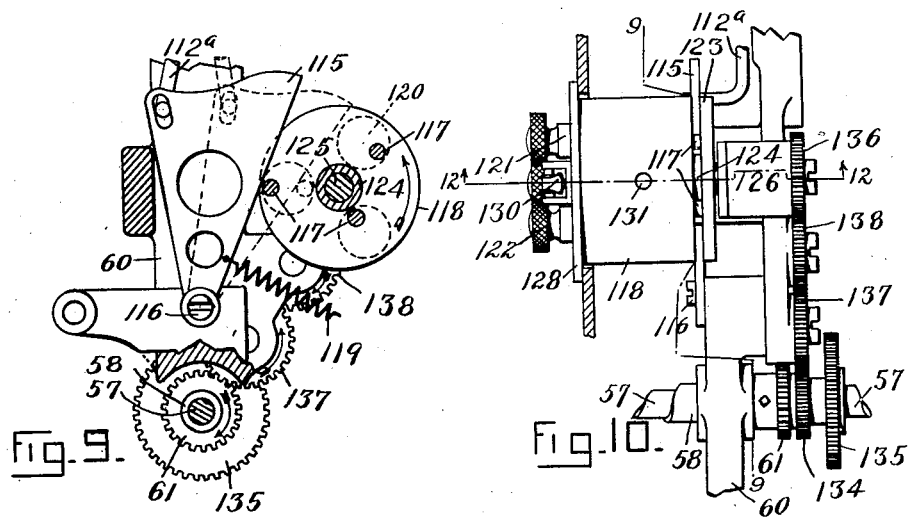
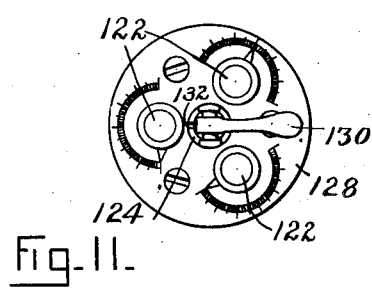
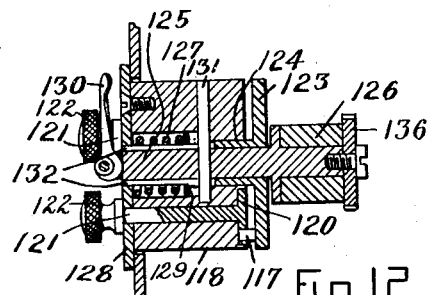
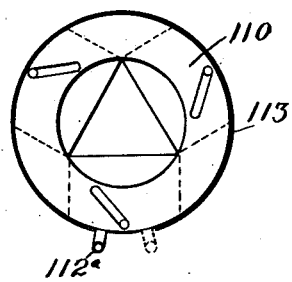
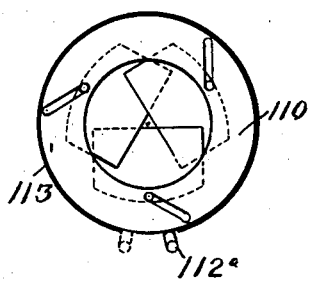
Witnesses:
Inventor:
Wm. C. Huebner
by Wilhelm Parker Hard
Attorneys.

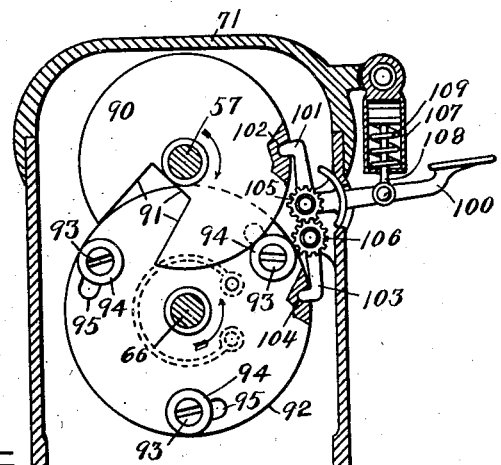
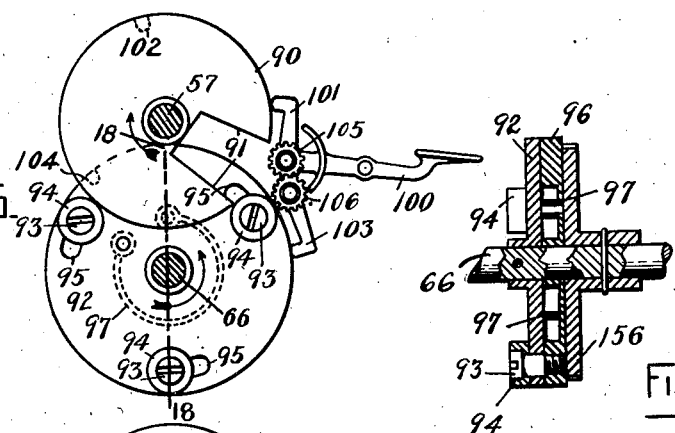
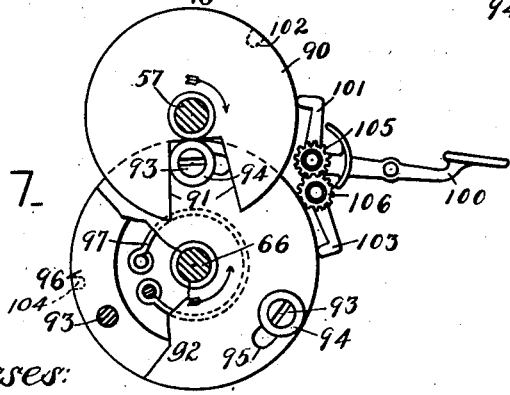

W. C. HUEBNER.
PHOTOGRAPHIC CAMERA.
APPLICATION FILED MAY 31, 1912.

1,051,591.

Patented Jan. 28, 1913.
11 SHEETS—SHEET 8.

Witnesses:

Inventor

W. C. HUEBNER.
PHOTOGRAPHIC CAMERA.
APPLICATION FILED MAY 31, 1912.

1,051,591.

Patented Jan. 28, 1913.

11 SHEETS—SHEET 9.

Witnesses:

Inventor:
Wm C. Huebner
by Wilhelm Parker Haus
Attorneys.

W. C. HUEBNER.
PHOTOGRAPHIC CAMERA.
APPLICATION FILED MAY 31, 1912.

1,051,591.

Patented Jan. 28, 1913.
11 SHEETS—SHEET 10.

Witnesses:

Inventor.
Wm. C. Huebner
by Wilhelm, Parker & Heard
Attorneys.

W. C. HUEBNER.
PHOTOGRAPHIC CAMERA.
APPLICATION FILED MAY 31, 1912.

1,051,591.

Patented Jan. 28, 1913.
11 SHEETS—SHEET 11.

Witnesses:

Inventor
Wm. C. Huebner
by Wilhelm Parker Hand
Attorneys.

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PHOTOGRAPHIC CAMERA.

1,051,591. Specification of Letters Patent. Patented Jan. 28, 1913.

Application filed May 31, 1912. Serial No. 700,706.

*To all whom it may concern:*

Be it known that I, WILLIAM C. HUEBNER, a citizen of the United States, residing at Buffalo, in the county of Erie and State of New York, have invented a new and useful Improvement in Photographic Cameras, of which the following is a specification.

This invention relates to a camera for photographing colors directly from the object by one or several exposures for each color, either upon different portions of the same negative or upon separate negatives.

In its most complete form the camera comprises the following mechanisms: Shutters having an actuating mechanism which can be adjusted to regulate the duration of each exposure. An iris diaphragm having a controlling mechanism which can be adjusted to regulate the opening of the diaphragm for each exposure. A multi-color filter comprising a suitable number of individual color filters, usually three, mounted in such manner that by a rotary adjustment of the filter frame the individual color filters are brought in line with the optical axis and are held in that position during the exposure. A fractional screen having its area composed of minute transparent and opaque units, arranged in groups or sets corresponding as to the number of units with the number of colors and distributed around a common center in such manner that by a rotary adjustment the screen can be turned from one position corresponding with the position of one group or set of units to another position corresponding with the position of another set of units, thus exposing in each position of the screen only those portions of the sensitized surface which lie opposite transparent units and protecting the remaining portions of the sensitized surface which are covered by opaque screen units. A holder for the sensitized plate or surface which may be movable toward and from the screen in order to prevent the sensitized surface from being scratched or marred by the rotation of the screen. Automatic mechanism for moving the different movable parts of the camera to the position for exposure in the proper order or sequence and holding them in the adjusted position during the exposure.

Figure 2:
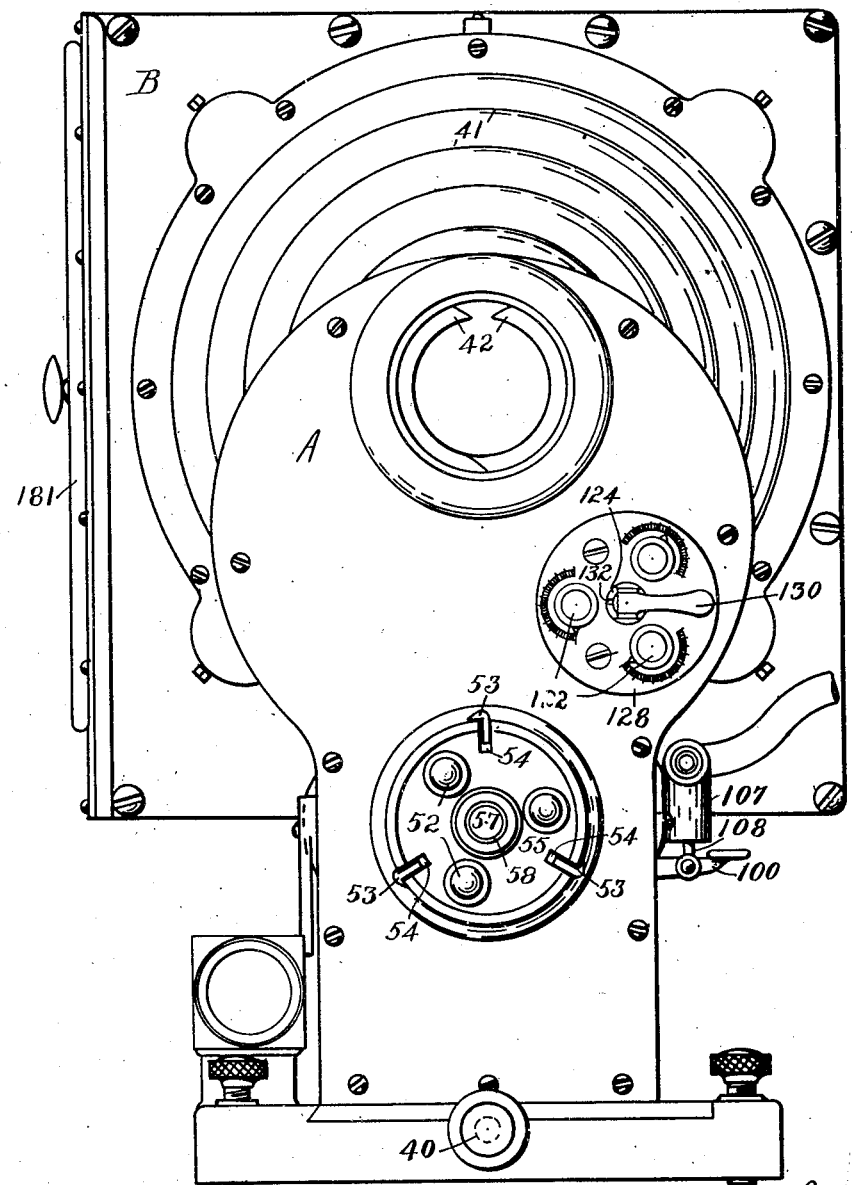
Figure 3:
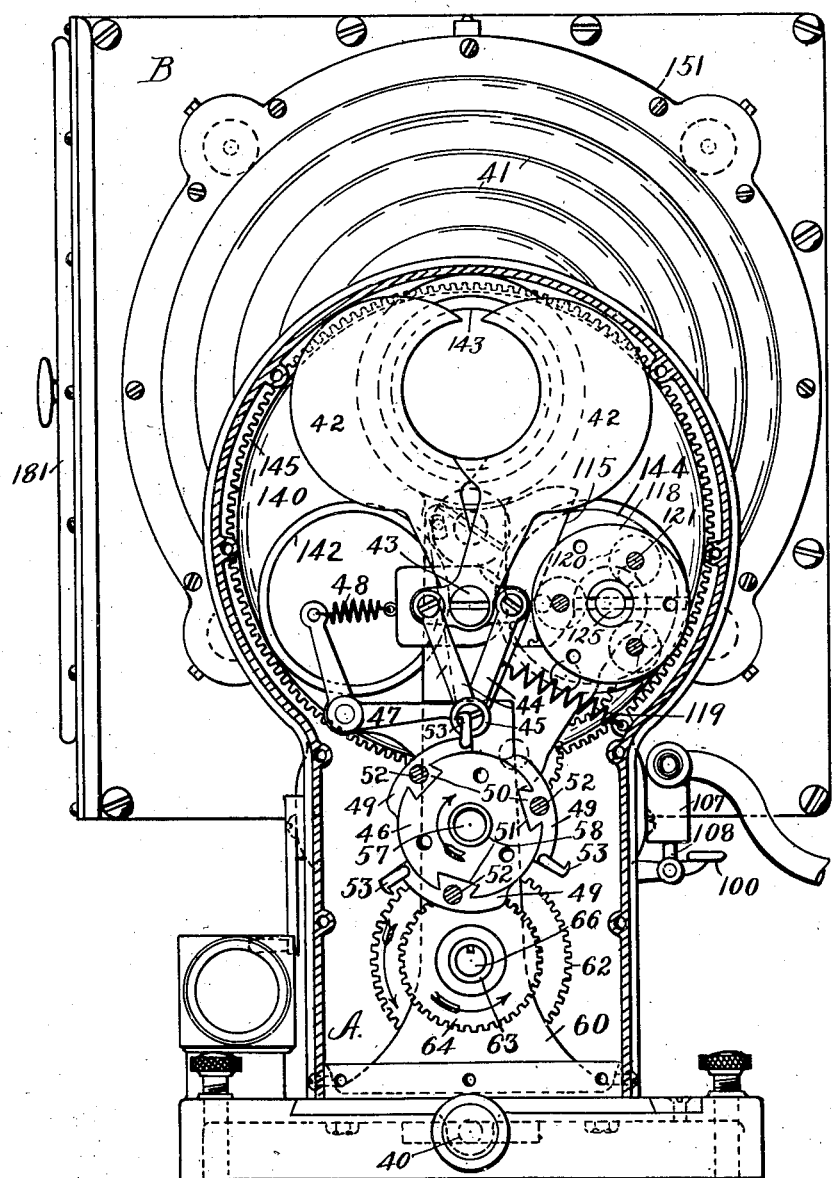
Figure 19:
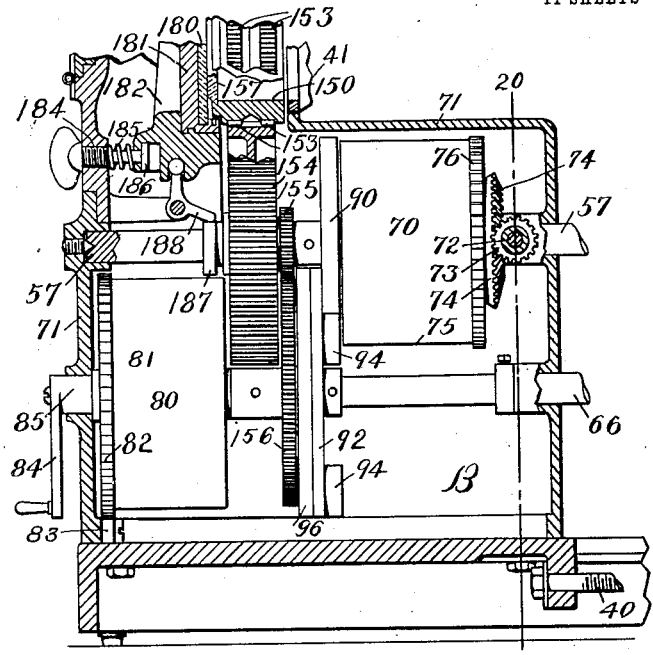
Figure 21:
Figure 20:
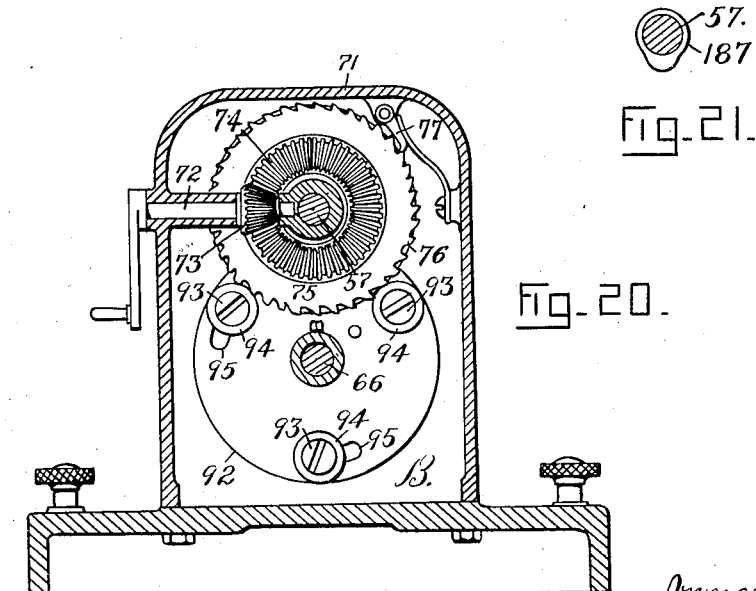
Figure 22:
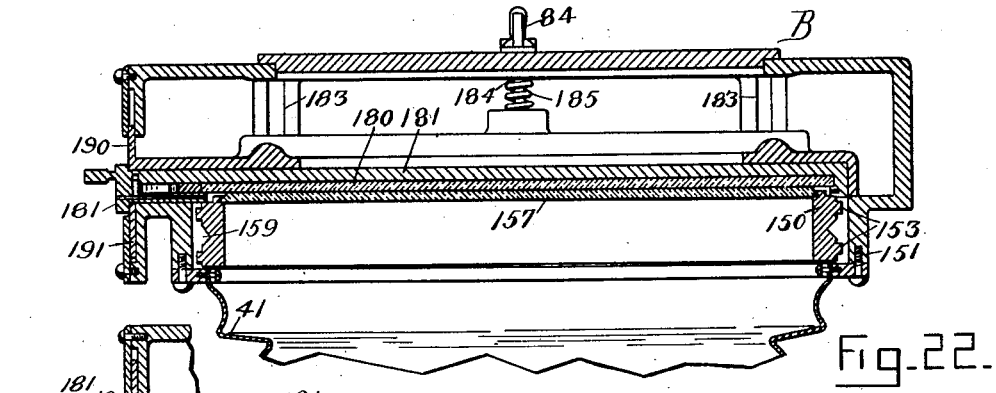
Figure 23:
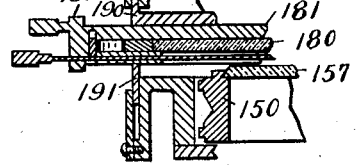
Figure 24:
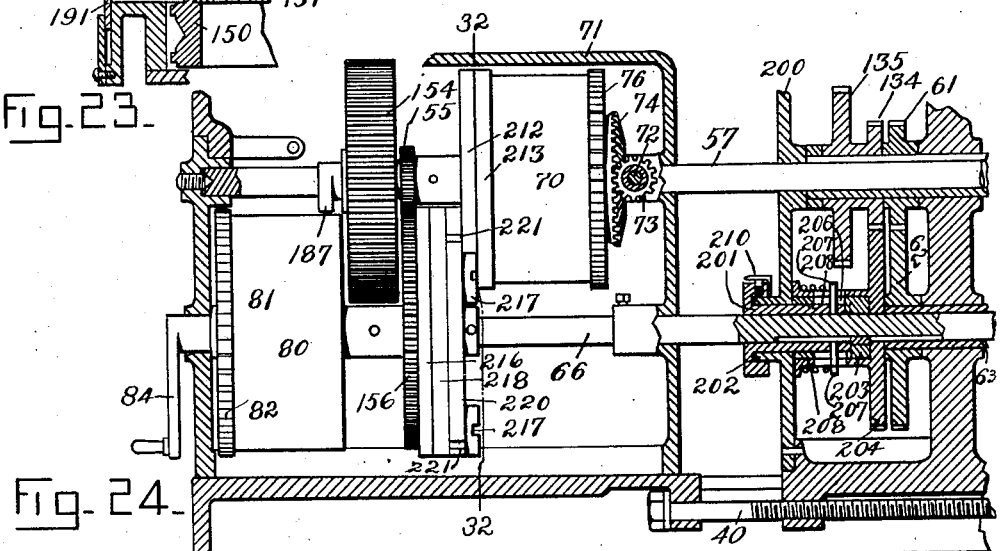
Figures 25, 26, 27:
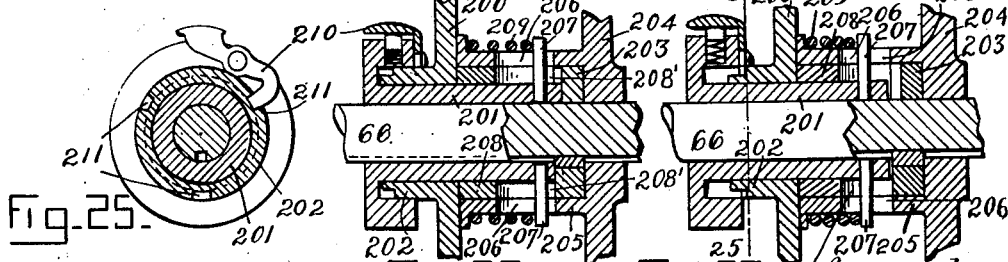
Figure 32:
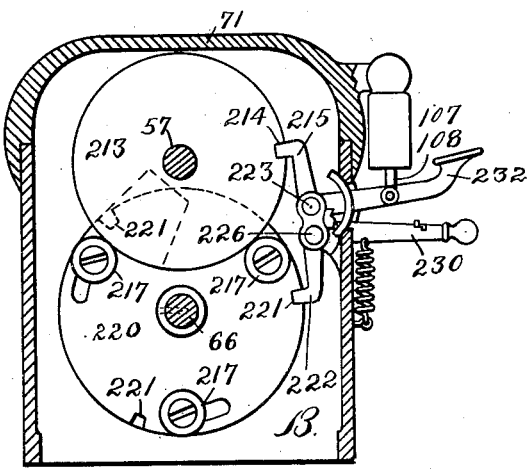
Figure 33:
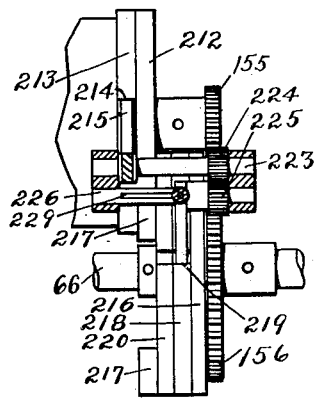
Figures 28, 29:
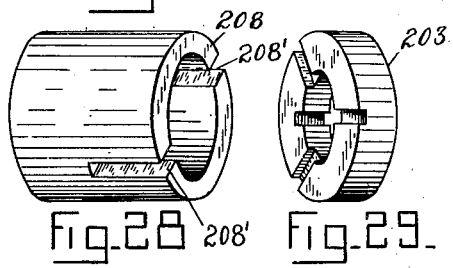
Figure 34:
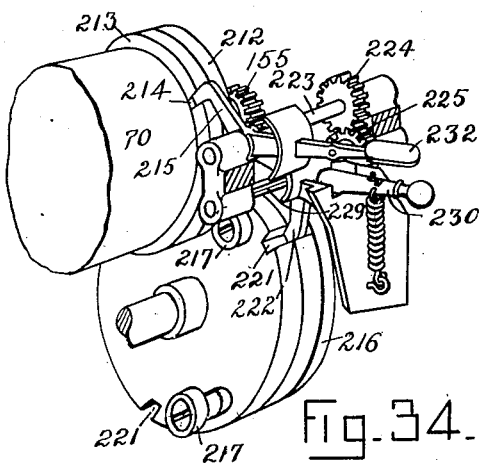
Figure 30:
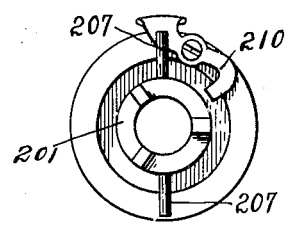
Figures 31, 35:
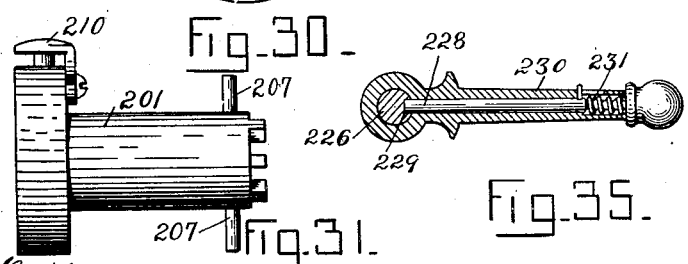
Figure 36:
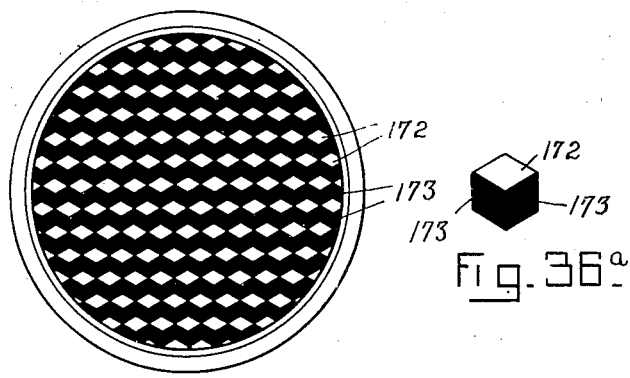
Figure 37:
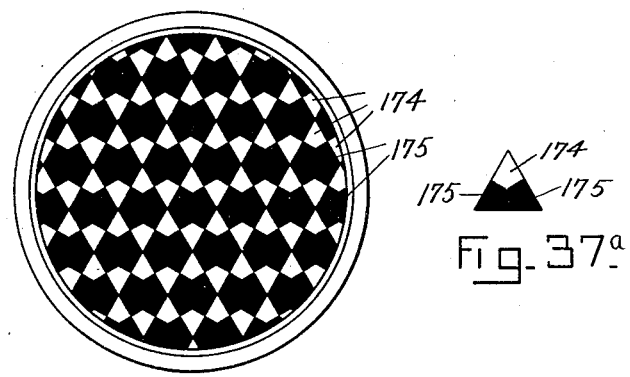
Figure 38:
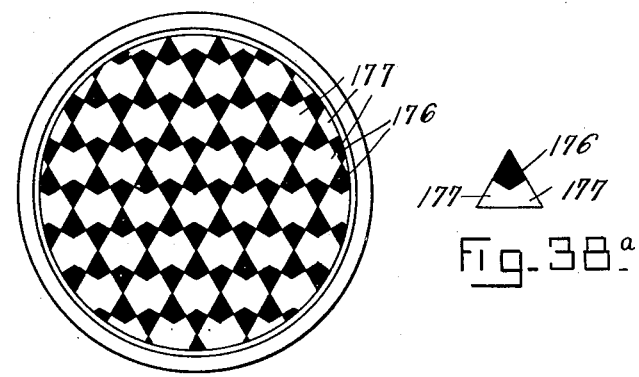

In the accompanying drawings: Figure 1 is a longitudinal sectional elevation of this improved camera. Fig. 2 is a front elevation of the camera. Fig. 3 is a vertical transverse section approximately on line 3—3, Fig. 1. Fig. 4 is a vertical transverse section on line 4—4, Fig. 1. Fig. 4$^a$ is a view showing, on an enlarged scale, one group of units of the screen shown in Fig. 4. Fig. 5 is a vertical transverse section on line 5—5, Fig. 1. Fig. 6 is a transverse section of the cam wheel for operating the shutters, the section being taken on line 6—6, Fig. 7. Fig. 7 is a longitudinal elevation of this cam wheel and connecting parts. Fig. 8 is a longitudinal section of the same. Fig. 9 is a transverse sectional elevation of the mechanism by which the iris diaphragm is controlled, the section being taken on line 9—9, Fig. 10. Fig. 10 is a side elevation of the same parts. Fig. 11 is a front elevation of the front plate and connecting parts of the mechanism by which the adjustable pins of the diaphragm regulator are frictionally held in place. Fig. 12 is a horizontal section of the same parts on line 12—12, Fig. 10, looking upward. Figs. 13 and 14 are front elevations of the iris diaphragm in different positions. Fig. 15 is a transverse sectional elevation on line 15—15, Fig. 1, of the escapement and stopping and starting mechanism. Figs. 16 and 17 are sectional front elevations of the escapement and stopping and starting mechanism in different positions. Fig. 18 is a longitudinal section through the lower disk of the escapement on line 18—18, Fig. 16. Fig. 19 is a longitudinal sectional elevation of the rear portion of the driving mechanism comprising the two spring motors and connecting parts. Fig. 20 is a transverse section on line 20—20, Fig. 19. Fig. 21 is a rear elevation of the cam on the rear portion of the upper shaft of the driving mechanism. Fig. 22 is a horizontal section of the rear portion of the camera comprising the holder for a sensitized plate, the screen and adjacent parts, the sensitized plate being shown in contact with the screen. Fig. 23 is a fragmentary horizontal section of the same parts, showing the plate holder moved backwardly to separate the sensitized plate from the screen. Fig. 24 is a longitudinal sectional elevation of a modified construction of the driving mechanism by means of which each color record can be made upon a separate negative. Fig. 25 is a cross section on line 25—25, Fig. 27. Fig. 26 is a longitudinal section of a coupling which connects the color filter with the lower shaft, the coupling being shown engaged and the same parts being shown on a smaller scale in Fig. 24. Fig. 27 is a similar view, showing the coupling released. Fig. 28 is a perspective view of the sleeve by which the coupling disk is held in place. Fig. 29 is a perspective view of the coupling disk. Fig. 30 is a detached end elevation of the coupling sleeve looking toward the left in Fig. 31. Fig. 31 is a side elevation of the coupling sleeve. Fig. 32 is a vertical cross section on line 32—32, Fig. 24. Fig. 33 is a side elevation, partly in section, of the escapement mechanism shown in Fig. 32. Fig. 34 is a perspective view of this escapement mechanism. Fig. 35 is a sectional view, on an enlarged scale, of the devices for releasably connecting the lower pawl of this mechanism with its shaft. Figs. 36, 37 and 38 represent screens having different forms of units, these units being greatly enlarged for the purpose of clearness in representation; and Figs. 36ª, 37ª and 38ª each represents a group of the units represented respectively in Figs. 36, 37 and 38, these groups being further enlarged.

Like reference characters refer to like parts in the several figures.

The frame of the camera comprises a front portion A and a rear portion B, the front portion containing the lenses, the shutter, the iris diaphragm and the color filter, while the rear portion contains the fractional screen, the holder for the sensitized surface and the spring motors. The front portion is adjustable in the direction of the optical axis for focusing by any suitable means, for instance, an adjusting screw 40, Fig. 1. The front and rear portions are connected by the usual hood 41.

*The shutter mechanism.*—The shutter mechanism shown in Figs. 1, 2, 3, comprises two crescent-shaped plates 42, which are pivoted on a stud 43 and are each provided with a link 44. The lower ends of these links are connected and provided with a roller 45 which bears upon a cam wheel 46 against which the roller is held by an elbow lever 47 and a spring 48. The cam wheel is provided with three cams 49, equidistant circumferentially, and each cam is adjustable in the axial direction of the wheel by any suitable means. As shown, each cam is provided on its under side with a dove-tail tenon 50 which is slidably fitted in a dove-tail groove 51 formed lengthwise in the peripheral face of the wheel. The cam is adjusted in the groove by an adjusting screw 52. Each cam 49 tapers rearwardly with reference to the direction in which the cam rotates, as shown in Fig. 7, and this taper determines the length of time during which the roller 45 is elevated by the cam. In the position of the roller shown in Fig. 7, the circumferential length of that portion of the cam which is underneath the roller is shortest. By adjusting the cam toward the front of the camera the circumferential length of the cam acting upon the roller is increased and the time during which the shutters are held open is correspondingly lengthened. Each cam can be adjusted separately to hold the shutters open for a greater or less period, thereby regulating the duration of each exposure. Each cam has at its front end a pointer 53 which projects through a longitudinal slot 54 formed in a cylindrical cover or casing 55 which is secured to the front end of the cam wheel 46, and this cover is provided adjacent to each slot with a longitudinal scale 56 by means of which the position of the cam can be determined.

*The driving mechanism.*—The mechanism by which the several movable parts of the camera are actuated (shown most clearly in Figs. 1, 3, 4, 15, 16, 17, 18, 19 and 20) comprises an upper and a lower longitudinal shaft, each of which is journaled in the front portion A and in the rear portion B of the camera frame in such manner that the front portion A can be moved back and forth for focusing. The upper shaft receives a continuous rotary movement and the lower shaft is so driven from the upper shaft that it has an intermittently rotary motion composed of three partial rotations separated by periods of rest and makes one revolution for every three revolutions of the upper shaft.

The upper continuously rotating shaft is composed of a solid rear portion 57 and a tubular front portion 58 which have a splined connection with each other, so that the tubular front portion is adjustable lengthwise on the solid rear portion and remains in driving engagement therewith. The cam wheel 46 is mounted loosely on the tubular front portion 58 and receives its motion from the same in such manner that it revolves once for every three revolutions of the shaft. For that purpose the tubular shaft is provided in rear of the bearing 59 formed in the standard 60 of the front portion of the camera, with a pinion 61 which meshes with a gear wheel 62 secured to the rear end of a tubular shaft 63 which carries near its front end a gear wheel 64 meshing with a gear rim 65 at the rear end of the cam wheel 46. The tubular shaft 63 is arranged concentric with the front portion of the lower shaft 66 which rotates intermittently and is journaled in a bearing 67 formed in the standard 60.

The upper shaft is rotated by a spring motor 70 which is arranged in a housing 71 forming part of the rear portion B of the camera and which is provided with a winding mechanism comprising a transverse shaft 72, a bevel wheel 73 secured thereto, and a bevel wheel 74 secured to the motor casing 75, which latter is provided with a ratchet rim 76 with which a detent pawl 77 engages, Figs. 19 and 20.

The lower shaft 66 is rotated by a spring motor 80 which is arranged in the rear portion of the housing 71 and which comprises a motor casing 81 having a ratchet rim 82 with which a detent pawl 83 engages. This motor can be wound up by means of a crank 84 secured to the hub 85 of the motor casing, Figs. 1 and 19.

The intermittent rotary motion of the lower shaft is regulated by means of an escapement which connects the two shafts and which is constructed as follows: 90 represents a disk which is secured to the rear end of the upper motor casing 70 and rotates therewith and which is provided with a deep radial notch 91. 92 is a disk which is arranged adjacent to the rear side of the disk 90 and secured to the lower shaft 66 and provided on its front side with three equidistant studs 93 preferably carrying antifriction rollers 94. When these studs and their rollers engage against the peripheral face of the upper disk 90, as shown in Figs. 15 and 16, they prevent rotation of the lower shaft, but during the rotation of the upper disk one of these rollers enters the notch 91 and this permits the lower shaft to rotate while the roller remains in the notch and so enables the lower shaft to make one-third of a revolution, Fig. 17. When the lower shaft has made this partial revolution the roller is withdrawn from the notch, as shown in Fig. 16, and the next following roller bears against the peripheral face of the upper disk 90 and prevents further rotation of the lower disk and its shaft. Each stud 93 is capable of a limited circumferential movement in the lower disk, which latter is provided for each stud with a circumferential slot 95 through which the stud passes and in which it can move back and forth with reference to the direction in which the disk turns. The studs 93 are secured to an annular plate 96 which is arranged against the rear side of the disk 92 and which is connected with the same by a bow spring 97 which tends to hold the studs against the front ends of the slots 95. When a roller strikes against the peripheral face of the upper disk this spring cushions the impact.

Both disks and their shafts are held against rotation by a stop lever 100 having an upper pawl 101 which is adapted to engage in a notch 102 of the upper disk 90, and a lower pawl 103 which is adapted to engage in a notch 104 of the lower disk 92. In the locked position of the mechanism both pawls 101 and 103 project into notches 102 and 104 of the disks 90 and 92, as shown in Fig. 15.

The upper pawl 101 is secured to the stop lever 100 and the lower pawl 103 is pivoted to the housing adjacent to the releasing lever and is actuated from the latter by means of gear wheels 105 and 106. The stop lever can be released by hand or by means of a pneumatic cylinder 107 and piston 108 of any suitable construction and is moved in the locking direction by a spring 109.

In the operation of this escapement the upper shaft rotates continuously and makes three complete revolutions, while the lower shaft makes three partial revolutions, each equal to one-third of a revolution, and separated by periods of rest.

*The iris diaphragm.*—The diaphragm 110 is of the usual construction and is arranged between the lenses 111 and 112. It is held in three positions, one for each exposure, and these positions may be alike or they may be different for different exposures. Each position can be separately regulated and for that purpose the following mechanism is provided, Figs. 1, 2, 5, 9–14:

113 represents the ring which connects the diaphragm members and this ring is provided in its lower portion with an arm 112ª which is engaged by the upper portion of an upright lever 115 pivoted at its lower end to a stud 116 on the standard 60. The position of this lever 115 controls the opening of the diaphragm and the position of this lever is controlled by three pins 117 arranged on a rotary controller wheel 118. The regulating lever 115 is held against these pins by a spring 119. Each of these pins is adjustable toward and from the axis of the controller wheel to regulate the position of the lever 115 which, in the position farthest removed from the axis of the wheel, holds the diaphragm wide open, and reduces the opening as it approaches the axis.

Each of the pins 117 projects rearwardly from a disk 120 formed on the rear end of a longitudinal stem 121 which is journaled in the controller wheel 118 and provided with a finger-piece 122 at its front end. By turning the stem 121 the pin 117, which is eccentrically journaled by the stem in the wheel, is caused to approach the axis of the wheel or recede therefrom. The three pins 117 are held in their adjusted positions by a friction disk 123 which bears against these pins and which is formed on the rear end of a sleeve 124 which surrounds a shaft 125 journaled in a bearing 126 formed on the standard 60. The sleeve 124 and the friction disk 123 formed thereon are pressed rearwardly by a spring 127 which surrounds the front portion of the sleeve and bears at the front against a front plate 128 secured to the front side of the controller wheel 118 and at the rear against studs 129 projecting from the sleeve. The latter is provided in front of the front plate 128 with a clamping lever 130 which is pivoted to the front end of the sleeve and which bears against the front end of the shaft 125. By closing the clamping lever against the front plate, as shown in Figs. 2 and 11, the friction disk 123 is pressed against the pins 117 and the latter are held in position against accidental displacement. Upon releasing this lever the spring moves the friction disk rearwardly and releases the pins and permits each of them to be separately adjusted. The front plate 128 is preferably provided around each stem with a graduation by which the position of the controlling pin 117 can be determined. The shaft 125 is secured to the wheel 118 by a transverse pin 131 and the sleeve 124 is provided with longitudinal slots 132 through which this pin passes and which permit this sleeve to be moved back and forth on the shaft.

The regulating wheel is rotated from the lower intermittently rotating shaft 66 by a train of gear wheels which comprises a wheel 133 secured to the lower shaft, a pinion 134 which is mounted loosely on the upper shaft and which is formed in one piece with a wheel 135 by which the multi-color filter is rotated, a wheel 136 secured to the rear end of the shaft 125, a wheel 137 which meshes with the pinion 134, and an idler 138 which is interposed between the wheels 136 and 137.

*The color filter.*—The frame 140 of the multi-color filter is arranged in the front part of the camera in rear of the lenses and is pivoted on a stud 141, Figs. 1, 3 and 5. It contains three individual color filters 142, 143 and 144 arranged equidistant about the center in such manner that in the position of rest the uppermost individual filter is located in the optical axis. The frame 140 is provided with a gear rim 145 with which meshes the gear wheel 135 already referred to as being formed in one piece with the pinion 134, which latter is driven by the wheel 133 on the lower shaft 66, whereby the filter frame is moved one-third of a revolution at a time and held stationary between these partial revolutions.

The three individual color filters are respectively orange, green and violet and produce respectively on the sensitized surface records of the blue rays, the red rays, and the yellow rays.

*The fractional screen.*—This screen has the purpose to effect the exposure of the sensitized surface by several successive fractional exposures, one for each color, the screen being located between the multi-color filter and the sensitized surface. The screen area is composed of minute transparent and opaque units so shaped and arranged about a common center that by rotating the screen about the center the screen is turned from one position corresponding with the position of one set of units and with the position of one of the individual color filters to another position corresponding with the position of another set of units. By rotating the screen from one position to another a set of opaque units and a set of transparent units are caused to change positions, thus exposing in each position of the screen only those portions of the sensitized surface which lie opposite transparent units and protecting those portions which lie opposite opaque units.

150, Figs. 1, 4, 19 and 22, represents the circular screen frame which is mounted within a cylindrical bearing frame 151 forming part of the rear portion B of the camera. The screen frame is rotatably mounted in the bearing frame by any suitable means, preferably, as shown, by guide rollers 152 which are mounted in the bearing frame and bear against the peripheral face of the screen frame. The screen frame is provided with gear rims 153 with which meshes a gear wheel 154 which is mounted loosely upon the rear portion of the upper shaft 57 and provided with a pinion 155 which is in mesh with a gear wheel 156 secured to the lower shaft 66 in rear of the escapement disks. These wheels are so proportioned that the screen makes one-third of a revolution for every partial revolution of the intermittently rotating lower shaft, the screen frame and the color filter frame moving in unison.

157 represents the screen which may be of glass and is secured in the rear portion of the screen frame by any suitable means. The bearing frame is preferably provided with means for preventing circumferential displacement of the screen frame, such as a spring bolt 158, Figs. 1 and 4, which yields when the screen frame is rotated and engages in a depression 159 in the screen frame and holds the latter yieldingly in the position of rest.

The screen area is composed of minute transparent and opaque units which are arranged in regular order about a common center and may be shaped and arranged in groups in a variety of ways. When three individual color filters are employed, the groups of units on the screen are shaped and arranged in such manner that the screen area is composed of three groups of units, one group transparent and two opaque or two groups transparent and one opaque. In each of the three positions of the screen, 120° apart, the group of transparent units exposes a corresponding fraction of the sensitized surface and shifts from one position to another during each rotary adjustment of the screen in unison with the rotary adjustment of the multi-color filter.

The screen represented in Figs. 4 and 4ª has three-sided transparent units 170 and like opaque units 171, of which two transparent units and four opaque units form a trigonal group. This screen exposes in each of its three positions, 120° apart, one-third of the area of the sensitized surface.

The screen represented in Figs. 36 and 36ª has rhomb-shaped transparent units 172 and similar opaque units 173, of which one transparent unit and two opaque units form a hexagonal group. This screen also exposes in each of its three positions one-third of the area of the sensitized surface.

The screen represented in Figs. 37 and 37ª has four-sided transparent units 174 and similar opaque units 175, of which one transparent unit and two opaque units are combined in a triangular group. This screen exposes in each of its three positions one-third of the area of the sensitized surface.

The screen represented in Figs. 38 and 38ª has four-sided opaque units 176 and similar transparent units 177, of which one opaque unit and two transparent units are combined in a triangular group. This screen exposes in each of its three positions two-thirds of the area of the sensitized surface.

In these figures the units are greatly enlarged.

If more than three individual color filters are employed in the color filter frame, the mechanism and the grouping of the units of the screen area are modified to correspond with the number of color filters.

*The holder for the sensitized surface.*—This holder is represented most clearly in Figs. 1, 19, 22, and 23. 180 represents the sensitized plate, 181 the slide in which the plate is arranged and 182 the holder for the slide arranged in rear of the screen frame and made movable toward and from the screen so that in case the sensitized surface should bear against the screen the holder and the sensitized plate can be moved away from the screen before the latter begins its rotary movement. The holder is mounted on longitudinal guides 183 in the rear portion of the camera and a longitudinal stop bolt 184 is provided which limits the movement of the holder toward the screen frame. This bolt is adjustable lengthwise of the camera and provided with a spring 185 which presses the holder forwardly against the head 186 of the bolt, by which the movement of the holder toward the screen is arrested. The holder is moved against the pressure of this spring to clear the screen by a cam 187 on the rear portion of the upper shaft 57 and an elbow lever 188 which bears against this cam and engages the holder. The cam is so shaped that it moves the plate holder away from the screen before the screen begins its rotary movement and permits the plate holder to be moved toward the screen after the latter has been rotated to the new position. This arrangement for moving the plate holder back and forth is required only when the sensitized surface is normally in contact with the screen during the exposure and is not required when there is a normal clearance between the sensitized surface and the screen. The device which is hereinafter referred to as the plate holder may be any suitable device for holding the material provided with the sensitized surface and which may be glass, paper, film or any other suitable material.

The slide 181 of the plate holder is protected at the open end of the slot in which it is arranged by guard plates 190 and 191, Figs. 22 and 23, to prevent the admission of light during the movement of the slide and holder toward and from the screen. In Fig. 22 the slide and holder are shown in the position in which the sensitized plate is in contact with the screen and in Fig. 23 the plate has been moved away from the screen.

*Operation.*—In the initial position of the parts, the rotary screen, the rotary multi-color filter and the iris diaphragm are in the proper position for making the first exposure and the shutters are closed. The sensitized plate having been placed in the camera the mechanism is started by depressing the stop lever 100, thereby releasing the disks 90 and 92. The mechanism now opens the shutters and holds the same open for the desired period of time and when that period has expired the shutters are closed, the plate holder moves the sensitized surface away from the screen, and the screen and the multi-color filter are turned one-third of a revolution to the next position for exposure. The diaphragm is acted upon by the regulator if its position is to be changed for the next exposure. After the screen and the multi-color filter have arrived in the new position the plate holder moves toward the screen to the position for exposure and the shutters are opened and remain open during the period for which the device is adjusted. The third exposure is made in the same way and after the shutters have been closed and the plate holder has been moved away from the screen, the latter and the multi-color filter are rotated to the next position and in this position the parts are arrested by the pawls 101 and 103 engaging in the notches 102 and 104, respectively, of the disks 90 and 92. In this manner a separate record is made upon the sensitized surface of each of the three colors of which the rays are admitted to the sensitized surface by the multi-color filter. In each position the screen exposes through its transparent units numerous equally distributed points on the sensitized surface which in the aggregate cover a certain fraction of that surface, and the several exposures through the screen in its several successive positions cover the entire area of the sensitized surface except in so far as the exposed points are separated from each other by reason of the distance between the screen and the sensitized surface or according to the opening of the iris diaphragm. The several exposures produce on the sensitized surface printing points which can be separated more or less and each exposure can be separately timed and the operation can be repeated with the screen in each or some of the exposing positions, as may be deemed desirable. Negatives so produced when developed, fixed and dried in any suitable manner can be utilized in various ways. For instance, each of these color records can be printed separately upon a printing surface, stone or plate suitable for photo-mechanical printing and when these separated colors are printed from these printing surfaces they produce a multi-color print in which each color is printed in exact register, the effect being a clear rendering of each color. When three color records are made on the same negative, as described, they can be separated in printing from the negative by means of the screen. For that purpose the negative is placed in exact register with the screen and the latter is placed successively in each of the described three positions and the print is taken from the negative in each of these positions. Each print is a reproduction of the color which corresponds with the record on the negative which is exposed to the transparent portions of the screen. The color record negatives produced as herein described can also be used for producing color photographs upon a multi-color base which may be paper, glass, film or other suitable material. The color areas or units are arranged on this base in exactly the same order as to their relative location in which they are arranged on the screen, so that complementary colors on the base correspond with the colors on the negative, the red units on the color base corresponding with the green units on the negative, the blue units on the color base with the orange units on the negative, and the yellow units on the base with the violet units on the negative.

*Modifications.*—Instead of producing several color records upon the same negative, as described, each color record may be produced upon a separate negative, in which case the driving mechanism is modified in such manner that the color filter can be held stationary.

For the purpose of holding the color filter in position with one of the individual filters in line with the optical axis, a releasable coupling is arranged on the lower driving shaft 66 by which this shaft is connected with the color filter, so that upon releasing this coupling the color filter is disconnected from the driving mechanism and can be held stationary. This construction of the driving mechanism is represented in Figs. 24–31.

200 represents the rear wall of the front part A of the casing and 201 represents a coupling sleeve arranged on the lower driving shaft 66 in a bearing 202 formed on this rear wall and capable of longitudinal movement on the shaft 66 to engage with a coupling disk 203 which is slidably keyed to the shaft 66. This disk is arranged adjacent to the wheel 204 which is substituted for the wheel 133 in the first described construction, where the wheel 133 is secured to the lower shaft 66, while in the modified construction the wheel 204 is loose on this shaft. In the first described construction the rotary color filter is actuated from the wheel 133 and in the modified construction it is actuated from the wheel 204. The hub 205 of the wheel 204 surrounds the sleeve 201 and the coupling disk 203 and is provided on diametrically opposite sides with longitudinal slots 206 in which engage pins 207 on the sleeve 201. The coupling disk 203 is held in position by a notched sleeve 208 having longitudinal slots 208' through which the pins 207 project. The coupling sleeve is moved toward the coupling disk 203 by a spring 209.

When the coupling sleeve is disengaged from the coupling disk, as shown in Fig. 27, the driving wheel 204 of the color filter is disconnected from the shaft 66 and the filter is stationary. When the coupling sleeve is engaged with the coupling disk, as represented in Fig. 26, the driving wheel 204 is coupled to the lower shaft and the color filter is rotated.

The coupling sleeve can be held in its retracted or uncoupled position by any suitable means, for instance, by a locking pawl 210 which is pivoted to the outer end of the coupling sleeve and engages in one of three notches 211 formed equidistant apart in the end of the bearing 202 on the rear wall 200 of the casing. By engaging the locking pawl in one of these three notches, the corresponding one of the three individual color filters is placed in line with the optical axis and held in this position.

In Figs. 32–35 an escapement mechanism is represented by means of which several different operations can be performed. In one operation the screen and the color filter are operated automatically, as in the first described form of the apparatus. In another operation the screen is rotated from one position to another automatically and the color filter is turned one-third of a revolution and stopped, thereby permitting the plate which has been exposed to be removed and a fresh plate to be inserted. In a third operation the screen and the color filter are both stationary and a number of exposures can be made successively of the same color and through the screen in the same position.

The upper escapement disk mounted on the upper shaft 57 is composed for convenience of two parts 212 and 213, arranged flatwise in contact. The part 212 is provided with a deep notch, shown by dotted lines in Fig. 32, similar to the notch 91 shown in Figs. 15-17, and the part 213 is provided with a locking notch 214 in which the locking pawl 215 engages when the upper shaft 57 has made one revolution.

The lower escapement disk is composed of three parts, arranged flatwise against each other, a part 216 which carries the rollers 217, a part 218 which is provided with a single locking notch 219, and a part 220 which is provided with three equidistant locking notches 221, these notches being arranged to receive the lower locking pawl 222.

The upper locking pawl 215 is secured to a horizontal shaft 223 which is geared by wheels 224 and 225 with the shaft 226 of the lower locking pawl 222. The last named pawl is slidably mounted on its shaft 226 so that it can be placed in line with either the disk part 218 having a single locking notch, or the disk part 220 having three locking notches to coöperate with either of those parts of the disk. The lower locking pawl is releasably attached to its shaft by any suitable means, for instance, by a coupling bolt 228 engaging in a longitudinal groove 229 in the shaft. This bolt is arranged in the hand lever 230 by means of which the lower pawl is shifted along its shaft. This shifting lever is held in position by friction and the coupling bolt is projected into the groove of the shaft by a spring 231. 232 represents the releasing lever secured to the upper pawl.

When the lower pawl 222 is coupled to its shaft and stands opposite the part 218 which is provided with the single locking notch 219, the mechanism operates like the mechanism first described, the lower disk making three successive partial revolutions, each equal to one-third, while the upper disk makes three complete revolutions. In this position of the parts the color filter and the screen are automatically rotated as in the first described construction of the apparatus, unless it should be desired to photograph only one color, in which case the color filter would be uncoupled from the driving mechanism and set for the color which it is desired to photograph.

When the lower pawl 222 is coupled to its shaft but arranged opposite the part 220 of the lower escapement disk, which is provided with three locking notches, the rotation of the lower shaft 66 is arrested at the end of every one-third of a revolution and the parts are locked after every exposure. The escapement must then be unlocked for making the next exposure.

When the lower pawl 222 stands in the last described position, that in which it faces the part 220 having three notches but is uncoupled from its shaft, the lower shaft 66 is locked against rotation and both the screen and the color filter are stationary so that successive exposures can be made of the same color through the screen in the same position.

The details of the mechanisms which are herein shown and described are illustrative of suitable means for producing the desired results but can be modified in various ways without departing from the invention.

I claim as my invention:

1. In a camera, the combination of a holder for a sensitized surface, a rotatable fractional screen having its area composed of minute transparent and opaque units arranged in regular order about a common center, mechanism for shifting said screen by a partial rotation from one position to another, and a color filter, substantially as set forth.

2. In a camera, the combination of a holder for a sensitized surface, a rotatable fractional screen having its area composed of minute transparent and opaque units arranged in regular order about a common center, mechanism for shifting said screen by a partial rotation from one position to another, a multi-color filter having a plurality of individual color filters, and means for shifting said color-filter from one position to another, substantially as set forth.

3. In a camera, the combination of a rotatable multi-color filter having a plurality of individual color filters, a rotatable fractional screen having its area composed of minute transparent and opaque units arranged in regular order about a common center, mechanism for shifting said screen by a partial rotation from one position to another, and mechanism for rotating said multi-color filter, substantially as set forth.

4. In a camera, the combination of a rotatable multi-color filter having a plurality of individual color filters, a rotatable fractional screen having its area composed of minute transparent and opaque units arranged in regular order about a common center, said screen units being arranged in groups corresponding in number and arrangement with the number and arrangement of the individual color filters, mechanism for shifting said filter by a partial rotation, and mechanism for shifting said screen by a partial rotation, substantially as set forth.

5. In a camera, the combination of a rotatable multi-color filter having three individual color filters, a rotatable fractional screen having is area composed of minute transparent and opaque units arranged in regular order about a common center, said screen units being arranged in groups of three, and mechanisms for shifting said filter and said screen by a partial rotation from one position to another, substantially as set forth.

6. In a camera, the combination of a rotatable multi-color filter having a plurality of individual color filters, a rotatable fractional screen having its area composed of minute transparent and opaque units arranged in regular order about a common center, and a driving mechanism comprising an intermittently rotating shaft from which said filter and said screen are shifted from one position to another by a partial rotation, substantially as set forth.

7. In a camera, the combination of a rotatable multi-color filter having a plurality of individual color filters, a rotatable fractional screen having its area composed of minute transparent and opaque units arranged in regular order about a common center, a driving mechanism comprising a continuously rotating shaft, an intermittently rotating shaft, motors for driving said shafts, an escapement connecting said shafts, and mechanism for rotating said filter and said screen intermittently from said intermittently rotating shaft, substantially as set forth.

8. In a camera, the combination of a rotatable multicolor filter having a plurality of individual color filters, a rotatable fractional screen having its area composed of minute transparent and opaque units arranged in regular order about a common center, a driving mechanism comprising a continuously rotating shaft, an intermittently rotating shaft, and an escapement connecting said shafts and composed of a disk mounted on the continuously rotating shaft and provided with a notch, a disk mounted on the intermittently rotating shaft and provided with a plurality of studs adapted to enter said notch, one at a time, or to bear against the peripheral face of said notched disk, and motors for rotating said shafts, substantially as set forth.

9. In a camera, the combination of a rotatable multicolor filter having a plurality of individual color filters, a rotatable fractional screen having its area composed of minute transparent and opaque units arranged in regular order about a common center, a driving mechanism comprising a continuously rotating shaft, a disk mounted on the same and provided with a notch, an intermittently rotating shaft, a disk mounted on the same and provided with a plurality of studs adapted to enter said notch, one at a time, or to bear against the peripheral face of said notched disk, a cushioning device for said studs, and motors for rotating said shafts, substantially as set forth.

10. In a camera, the combination of a rotatable multicolor filter having a plurality of individual color filters, a rotatable fractional screen having its area composed of minute transparent and opaque units arranged in regular order about a common center, a driving mechanism comprising a continuously rotating shaft, a disk mounted on the same and provided with a notch, an intermittently rotating shaft, a disk mounted on the same and provided with a plurality of studs adapted to enter said notch, one at a time, or to bear against the peripheral face of said notched disk, locking pawls adapted to engage said disks, and motors for rotating said shafts, substantially as set forth.

11. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, and a yielding stop for holding the screen yieldingly against circumferential displacement, substantially as set forth.

12. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, and a plate holder arranged in rear of the screen and movable toward and from the same, substantially as set forth.

13. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, a plate holder arranged in rear of the screen and movable toward and from the same, and automatic mechanism for moving the plate holder from and to the screen, substantially as set forth.

14. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, a plate holder arranged in rear of the screen and movable toward and from the same, and automatic mechanism for moving the plate holder from and to the screen comprising a drive shaft provided with a cam and a lever engaging said cam and said plate holder, substantially as set forth.

15. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, shutters and actuating mechanism for the same provided with adjusting means for regulating the opening and closing thereof, substantially as set forth.

16. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, shutters and actuating mechanism for the same comprising a cam wheel provided with a circumferential series of tapering cams which are axially adjustable on the wheel, substantially as set forth.

17. In a camera, the combination of a rotatable multicolor filter having a plurality of individual color filters, a rotatable fractional screen having its area composed of minute transparent and opaque units arranged in regular order about a common center, mechanism for shifting said filter and said screen by a partial rotation from one position to another, shutters and actuating mechanism for the same comprising a cam wheel provided with a circumferential series of tapering cams which are axially adjustable on the wheel and provided with a pointer, and a casing secured to said wheel and provided with longitudinal slots in which said pointers move in adjusting the cams, substantially as set forth.

18. In a camera, the combination of a rotatable multicolor filter having a plurality of individual color filters, a rotatable fractional screen having its area composed of minute transparent and opaque units arranged in regular order about a common center, shutters, and actuating mechanism comprising a continuously rotating shaft provided with a cam wheel for actuating the shutters and an intermittently rotating shaft geared with said filter and said screen, substantially as set forth.

19. In a camera, the combination of a rotatable multicolor filter having a plurality of individual color filters, a rotatable fractional screen having its area composed of minute transparent and opaque units arranged in regular order about a common center, an iris diaphragm, controlling mechanism whereby the opening of the diaphragm is separately controlled for each exposure, and mechanism for shifting said filter and screen by a partial rotation from one position to another, substantially as set forth.

20. In a camera, the combination of a rotatable multicolor filter having a plurality of individual color filters, a rotatable fractional screen having its area composed of minute transparent and opaque units arranged in regular order about a common center, an iris diaphragm, controlling mechanism whereby the opening of the diaphragm is separately controlled for each exposure and which comprises independently adjustable controlling pins, and mechanism for shifting said filter and screen by a partial rotation from one position to another, substantially as set forth.

21. In a camera, the combination of a rotatable multicolor filter having a plurality of individual color filters, a rotatable fractional screen having its area composed of minute transparent and opaque units arranged in regular order about a common center, an iris diaphragm, controlling mechanism whereby the opening of the diaphragm is separately controlled for each exposure and which comprises controlling pins which are eccentrically journaled in a controller wheel and frictional holding means for said pins, and mechanism for shifting said filter and screen by a partial rotation from one position to another, substantially as set forth.

22. In a camera, the combination of a rotatable multicolor filter having a plurality of individual color filters, a rotatable fractional screen having its area composed of minute transparent and opaque units arranged in regular order about a common center, an iris diaphragm, controlling mechanism whereby the opening of the diaphragm is separately controlled for each exposure and which comprises controlling pins which are eccentrically journaled in a controller wheel, a frictional holding disk mounted on a stem which is slidably arranged in said wheel, and a clamping lever for pressing said disk against said pins, and mechanism for shifting said filter and screen by a partial rotation from one position to another, substantially as set forth.

23. In a camera, the combination of a rotatable multicolor filter having a plurality of individual color filters, a rotatable fractional screen having its area composed of minute transparent and opaque units arranged in regular order about a common center, an iris diaphragm and shutters, and actuating mechanism comprising a continuously rotating shaft provided with a cam wheel for actuating the shutters and an intermittently rotating shaft connected with said diaphragm, said filter and said screen, substantially as set forth.

24. A camera comprising a front portion and a rear portion which are adjustable toward and from each other for focusing, said front portion containing the lenses, the shutters, the iris diaphragm and a rotatable multi-color filter and said rear portion containing a rotatable fractional screen having its area composed of minute transparent and opaque units arranged in regular order about a common center, substantially as set forth.

Witness my hand, this 24th day of May, 1912.

WILLIAM C. HUEBNER.

Witnesses:
EDWARD WILHELM,
C. B. HORNBECK.